R. P. LAMBERT.
MEAT TRANSPORT.
APPLICATION FILED OCT. 25, 1920.
1,391,126.
Patented Sept. 20, 1921.
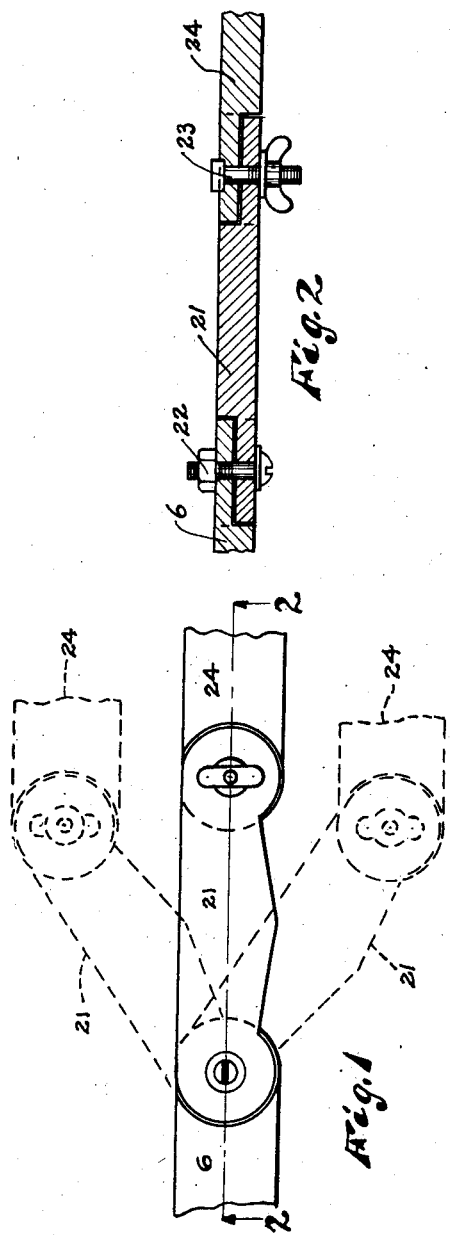
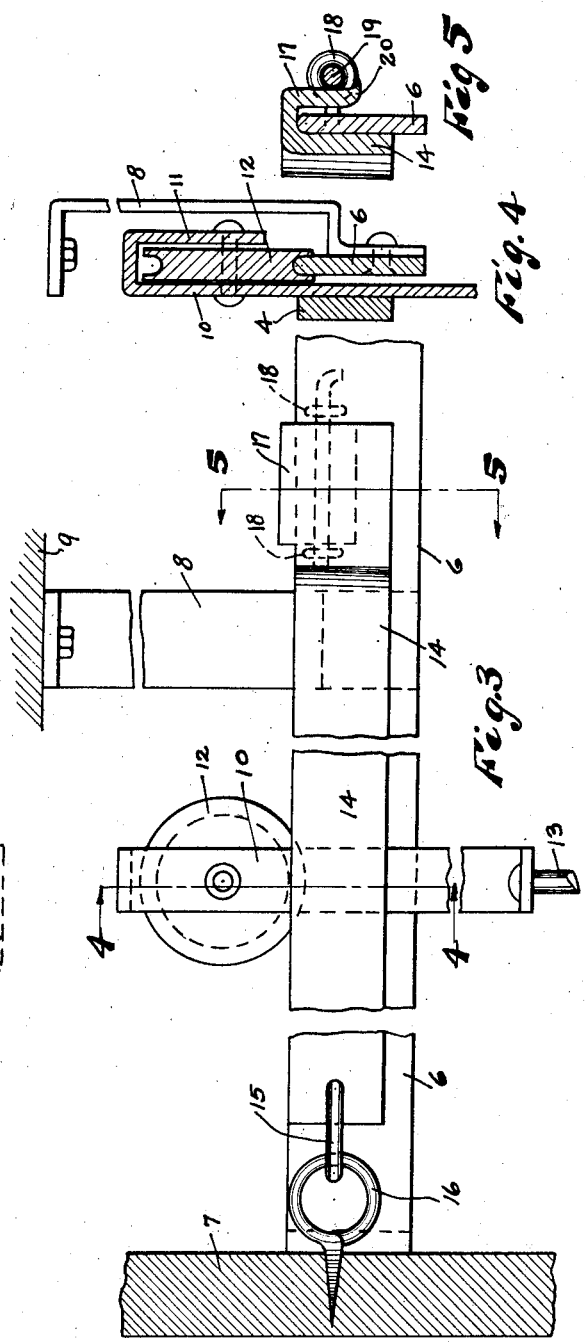
Witnesses:
C. E. Thiely
B. G. Richards
Inventor
Rudolph P. Lambert
By Joshua R. H. Potts
His Attorney

UNITED STATES PATENT OFFICE.

RUDOLPH P. LAMBERT, OF CHICAGO, ILLINOIS.

MEAT-TRANSPORT.

1,391,126. Specification of Letters Patent. Patented Sept. 20, 1921.

Application filed October 25, 1920. Serial No. 419,418.

*To all whom it may concern:*

Be it known that I, RUDOLPH P. LAMBERT, a citizen of the United States, and a resident of the city of Chicago, county of Cook, and State of Illinois, have invented certain new and useful Improvements in Meat-Transports, of which the following is a specification.

My invention relates to improvements in meat transports and has for its object the provision of an improved construction of this character by means of which meat in the form of quarters of animals or the like may be transported from place to place with great efficiency and expediency.

Other objects will appear hereinafter.

The invention consists in the combinations and arrangements of parts hereinafter described and claimed.

The invention will be best understood by reference to the accompanying drawings forming a part of this specification, and in which, Figure 1 is a side view of the outer end of a supporting track employed in the construction;

Fig. 2 is a section taken on line 2—2 of Fig. 1;

Fig. 3 is a side view of the inner portion of said track;

Fig. 4 is a section taken on line 4—4 of Fig. 3;

Fig. 5 is a section taken on line 5—5 of Fig. 3.

The preferred form of construction as illustrated in the drawings comprises a suitable track 6 secured at its inner end of the rear wall 7 of the transport such as a motor truck, car or the like. The track 6 is also supported at intervals by suitable hangers 8 depending from the roof of the truck or car, and whereby the track will be securely supported but left free for the passage of meat hangers or supports thereon as indicated in Fig. 4. A plurality of such tracks is arranged in the upper portion of the transport in any suitable or desired manner and if desired suitable switches may be provided for communication between said tracks.

Provided for use in conjunction with the track 6 is a plurality of hangers 10, one of which is illustrated in the drawings. These hangers 10 are preferably and substantially an inverted L-form or shape provided at their upper ends with a lateral extension 11 to support a suitable supporting roller 12 adapted to run upon the track 6. Each hanger is provided at its lower end with a suitable hook 13 placed centrally under the corresponding roller 12 and adapted and arranged to support and carry the meat quarters.

Coöperating with each of tracks 6 is a lock bar 14 arranged adjacent one side thereof, the lock bar being connected at its inner end by ring 15 with a screw eye 16 secured to the rear wall of the transport and whereby the corresponding bar 14 is mounted for universally free swinging in any direction. At its outer end each bar 14 is laterally offset to rest against the corresponding track 6 but to embrace the shanks of any hangers 10 mounted thereon as indicated in Figs. 3 and 4. Each laterally offset portion is provided with an engaging lip or flange 17 adapted and arranged to fit over and engage the corresponding track 6 between two eyes 18 as indicated. A removable lock-bolt 19 is arranged to fit the eyes 18 to lock said extension in place and the extension is provided with a hook 20 to engage said bolt for this purpose. By this arrangement it will be observed that the track 6 may be filled with the hangers 10 and said hangers securely locked in place by means of the corresponding lock bar 14 and that when said lock bar is released and removed the corresponding hangers may be readily and laterally removed from the track if desired.

At its outer end track 6 is provided with a pivoted link continuation thereof 21 pivoted thereto by means of a bolt 22. The link 21 carries at its free end another bolt 23 by means of which said link may be readily attached to another track 24 as indicated. By this arrangement it will be observed that track 6 may be readily placed in operative communication or connection with the usual overhead track employed in storage or packing houses for moving or transferring the meat quarters about and whereby a track or tracks in the transport may be readily and conveniently loaded or unloaded with meat quarters.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. A meat transport comprising a track; a hanger traveling on said track and removable therefrom; and means located adjacent said track for simultaneously locking hangers thereon and releasing the same, substantially as described.

2. A meat transport comprising a track; a hanger traveling on said track and laterally removable therefrom; and means located adjacent said track for simultaneously locking hangers thereon and releasing the same, substantially as described.

3. A meat transport comprising a suspended track; a substantially inverted L-shaped hanger carrying a roller traveling on said track; and a locking bar located adjacent said track and arranged to simultaneously lock all hangers thereon, and release the same, substantially as described.

4. A meat transport comprising a suspended track; a substantially inverted L-shaped hanger carrying a roller traveling on said track; a freely swinging lock bar arranged adjacent to said track to contact with the shank of said hanger to prevent lateral removal thereof from said track; and detachable means for locking said bar in operative relation to said track, substantially as described.

5. A meat transport comprising a suspended track; a substantially inverted L-shaped hanger carrying a roller traveling on said track; a freely swinging lock bar arranged adjacent to said track to contact with the shank of said hanger to prevent lateral removal thereof from said track; detachable means for locking said bar in operative relation to said track; and a pivoted link at the end of said track, substantially as described.

In testimony whereof I have signed my name to this specification in the presence of two subscribing witnesses.

RUDOLPH P. LAMBERT.

Witnesses:
 ROSE K. TRIB,
 B. G. RICHARDS.